United States Patent Office 3,798,307
Patented Mar. 19, 1974

3,798,307
SEPARATION OF NICKEL FROM SALT MIXTURES CONTAINING NICKEL AND OTHER METAL SALTS
Roald R. Skarbo, Lexington, Mass., assignor to Kennecott Copper Corporation, New York, N.Y.
No Drawing. Filed Feb. 7, 1972, Ser. No. 224,234
Int. Cl. C22b 23/04; C01g 53/12
U.S. Cl. 423—143                                6 Claims

ABSTRACT OF THE DISCLOSURE

A new method for the separation of nickel from a metal salt mixture is disclosed. The method involves dissolution of the salt mixture at an elevated temperature in a solution of ammonium hydroxide and ammonium chloride, rapidly cooling the solution under controlled condition of pH and ammonium chloride concentration to selectively separate nickel as crystalline nickel ammine chloride.

CROSS-REFERENCES TO RELATED APPLICATIONS

The instant application is related to the following identified applications:

U.S. application Ser. No. 55,305, filed July 16, 1970, now U.S. Pat. No. 3,723,095, issued Mar. 27, 1973, entitled "Extraction of Copper and Nickel From Manganese Nodules," R. R. Skarbo inventor.

U.S. application Ser. No. 55,608, filed July 16, 1970, now U.S. Pat. No. 753,686, entiled "Recovery of Copper, Nickel, Cobalt and Molybdenum From Complex Ores," T. C. Wilder and J. J. Andreola inventors.

U.S. application Ser. No. 55,306, filed July 16, 1970, now U.S. Pat. No. 3,736,125, issued May 29, 1973, entitled "Two Stage Selective Leaching of Copper and Nickel From Complex Ores," T. C. Wilder inventor.

U.S. application Ser. No. 55,304, filed July 16, 1970, now U.S. Pat. No. 3,734,715, issued May 22, 1973, entitled "Extraction of Metal Values From Complex Ores," M. J. Redman inventor.

U.S. application Ser. No. 90,131, filed Nov. 16, 1970, now U.S. Pat No. 3,728,105, issued Apr. 17, 1973, entitled "Extraction of Metal Values From Manganese Deep Sea Nodules," R. R. Skarbo inventor.

BACKGROUND OF THE INVENTION

Field of invention

The instant application relates broadly to the field of hydrometallurgy and more specifically to the process of recovering nickel from a metal salt mixture. More specifically the application relates to the separation of nickel from a salt mixture containing nickel and copper; nickel and cobalt; or nickel, copper, cobalt and incidental impurities.

Prior art

The five related applications cited above provide methods of recovering copper, nickel and cobalt from a complex ore. The recovered copper, nickel and cobalt are generally in the form of basic carbonate salts. The method of this invention was developed to provide a rapid and relatively inexpensive way to separate nickel from the basic metal carbonate mixture. However, it is to be understood that the novel method can be used on any salt mixture containing nickel.

U.S. Pat. No. 3,232,750 relates to a method of obtaining nickel and cobalt from sulphide free ores or concentrates. The method comprises mixing the cobalt-nickel containing material with sulphuric acid to form metal sulphates, roasting the mixture to decompose all of the metal sulphates except the sulphates of nickel and cobalt, dissolving the cobalt and nickel sulphates in an aqueous solvent, adding a metal hypochlorite to precipitate the cobalt at a pH of about 5.5, separating the precipitated cobalt, and then precipitating the nickel by adding additional metal hypochlorate at a pH of about 6.

Pat. No. 2,647,820 teaches a process for recovering nickel from solutions containing nickel and cobalt by treating an ammoniacal solution containing metal values selected from nickel and cobalt values by adjusting the pH value of the solution to from about pH 8 to about pH 7.1, adding sulphuric acid to reduce the pH value to at least about 4 to convert the metal values to and precipitate them from the solution as metal ammonium sulphate, and separating the precipitated ammonium sulphate from the solution.

Pat. No. 669,899 (Frasch) discloses a nickel salt represented by the formula $Ni(NH_3)_2Cl_2+4NH_3$. The nickel salt is chemically precipitated by saturating a nickel salt solution with ammonia until all the nickel and all other materials in the solution are transformed into the corresponding ammonium salt, and then chemically precipitating the nickel ammonium chloride from the solution by the addition of a chlorine containing compound such as sodium or potassium chloride.

Other relevant patents relating to the recovery of metals from solution include U.S. Pat. Nos. 2,290,313; 2,506,159 and 2,647,828.

SUMMARY

The process of this invention recovers nickel by crystallization from metal salt mixtures containing nickel, and comprises the steps of dissolving the metal salt mixture in a solution of ammonium hydroxide and ammonium chloride at an elevated temperature, rapidly cooling the solution while maintaining an ammonium chloride concentration in the solution between about 1 molar to 4 molar, whereby nickel is selectively separated from the solution as crystalline nickel ammine chloride, and separating the crystalline nickel ammine chloride from the nickel depleted solution.

As noted above, metal salt mixtures containing nickel and other metals may be obtained from the complex ore described in the five related applications referred to above. These meal salt mixtures may contain, for example, carbonate mixtures having nickel-copper-cobalt ratios of about 5:5:1. This invention teaches a method of separating nickel from the salt mixture.

The metal salt mixture is preferably added to an aqueous solution containing ammonia and ammonium chloride. The ammonium chloride concentration of the solution should be at least 1 molar and preferably about 1.5 molar up to about 2 molar. The resulting solution will have a pH value of at least about 10 and preferably higher than 10. The solution containing the metal salt mixture is heated, preferably to the boiling point of the solution, to assure complete dissolution of the metal salt mixture. It may be advantageous to hold the solution at the boiling temperature for a few minutes, although this is not always necessary. Additional ammonium chloride is then added to the solution so that the ammonium chloride concentration now in the solution is from about 2.5 to about 4.0 molar and preferably about 3.5 molar. The pH of the solution, after the addition of ammonium chloride, will be maintained at about 10 and preferably higher.

The solution is then rapidly cooled in any convenient manner. In the laboratory the reaction flask may be immersed in cold water. In commercial operations the solution may be cooled in a vacuum or liquid-cooled crystallizer. The rapid cooling produces a crystalline nickel ammine chloride that may be readily filtered from the solution. Example III below gives an indication of the ease of removing crystallized nickel ammine chloride from solution and indication of the difficulty of removing precipitated nickel ammine chloride from the nickel depleted solution. The crystalline nickel ammine chloride may then be treated in a known manner to recover the nickel therefrom.

The crystalline nickel ammine chloride product will contain some minor amounts of copper and cobalt. The nickel-copper-cobalt ratio in the product will generally be about 100:2–5:1–6. If a cleaner product is desired, the nickel-copper-cobalt ratio may be increased by redissolving the crystalline nickel ammine chloride in an aqueous ammonia-ammonium chloride solution, heating to the boiling point, rapidly cooling the solution to cause crystallization, and separating the crystalline nickel ammine chloride from the solution. Following this procedure nickel-copper-cobalt ratios will be about 100:1<1.

The following specific examples are illustrative but not limitative of the invention described herein. All such variations which do not depart from the basic concept of the invention disclosed above are intended to come within the scope of the appended claims.

DESCRIPTION OF PREFERRED EMBODIMENTS

Example I

Thirty-two grams of a basic carbonate mixture assaying 21.7% nickel, 25.7% copper and 4.18% cobalt was added to 200 ml. of a solution containing 200 grams ammonia per liter and 1.5 molar ammonium chloride. The suspension was stirred at room temperature until the basic carbonate mixture was essentially completely dissolved. Twenty-one grams of ammonium chloride was then added to the solution in order to precipitate the nickel as $Ni(NH_3)_6Cl_2$ (hexammine nickel chloride). After addition of the ammonium chloride a slimy voluminous precipitate was formed almost instantaneously. After a precipitation time of about 30 minutes, the stirring was discontinued. The suspension of the precipitate was very difficult to filter.

After drying in air at room temperature, the precipitate analyzed 24.2% nickel, 0.75% copper and 1.53% cobalt, i.e. a nickel:copper:cobalt weight ratio of

100:3.1:6.3.

This example shows that the precipitation of nickel ammine chloride at ambient temperature results in a precipitate extremely difficult to filter. Consequently such a separation scheme using this procedure would be of little practical value.

Example II

Two hundred ml. of a solution containing 200 grams ammonia per liter and 1.5 molar ammonium chloride was added to 32 grams of a basic carbonate mixture. The basic carbonate mixture assayed 21.7% nickel, 25.7% copper and 4.18% cobalt. The suspension of carbonates in the solution was heated to boiling and maintained at boiling temperature for 2 minutes. The basic carbonate was completely dissolved within this time. Twenty-one grams of ammonium chloride was then added and dissolved in the hot solution. No precipitate appeared in the solution at this point. The solution was then rapidly cooled to room temperature by immersing the reaction flask in cold water. Upon cooling a coarse crystalline precipitate of $Ni(NH_3)_6Cl_2$ was rapidly formed. The crystallization was allowed to continue for 30 minutes. The crystallized $Ni(NH_3)_6Cl_2$ was readily filtered. After drying in air at room temperature the crystalline material was analyzed and contained 24.4% nickel, 0.54% copper and 1.45% cobalt, i.e. a Ni:Cu:Co weight ratio of 100:2.2:5.9.

This example demonstrates the preparation of crystalline $Ni(NH_3)_6Cl_2$ and shows that the solubility of $Ni(NH_3)_6Cl_2$ increases sharply as the temperature is increased allowing the recovering of nickel by crystallization from a hot solution. A further advantage demonstrated by this example is that the crystalline $Ni(NH_3)_6Cl_2$ is more readily filterable than precipitated $Ni(NH_3)_6Cl_2$ at ambient temperatures.

Example III

A comparison between the settling rates of crystallized nickel ammine chloride and precipitated nickel ammine chloride is shown by this example.

Two samples of basic carbonate mixtures, each weighing 32 grams and assaying 25.7% copper, 21.7% nickel and 4.18% cobalt, were added to 200 ml. volumes of a solution containing 200 grams ammonia per liter and 1.5 molar ammonium chloride. The contents of the two reaction flasks were then treated to recover nickel according to the methods of Examples I and II, respectively. Subsequently the content of each flask was transferred to a 250 ml. graduated cylinder and agitated to obtain an even distribution of the crystals and the precipitate in the liquid phase. The crystallized $Ni(NH_3)_6Cl_2$ and the precipitated $Ni(NH_3)_6Cl_2$ was then allowed to settle and the volume of the respective suspensions recorded after various time intervals. The results are shown in the table below.

TABLE I

| Time (min.) | Precipitated nickel ammine chloride volume of suspension (ml.) | Crystallized nickel ammine chloride volume of suspension (ml.) |
|---|---|---|
| 0 | 218 | 210 |
| 0.5 | 208 | 160 |
| 1.0 | 206 | 68 |
| 1.5 | 205 | 58 |
| 2.0 | 203 | 60 |
| 2.5 | 201 | 60 |
| 3.0 | 200 | 60 |
| 3.5 | 198 | 60 |
| 4.0 | 196 | 60 |
| 4.5 | 195 | |
| 5.0 | 193 | |
| 10.0 | 177 | |
| 15.0 | 160 | |
| 20.0 | 138 | |
| 25.0 | 127 | |
| 30.0 | 120 | |
| 35.0 | 117 | |
| 45.0 | 113 | |
| 57.0 | 111 | |
| 67.0 | 110 | |

The above data shows that the crystalline $Ni(NH_3)_6Cl_2$ prepared by the method of this invention has superior settling rates and a preferred pulp density. These factors are critical in any practical application of the method of this invention.

Example IV

This example illustrates improved separation of nickel from copper and cobalt is achieved by maintaining a pH value of at least 10.5 when recovering nickel from an ammoniacal solution.

A basic carbonate mixture containing copper, nickel and cobalt in a weight ratio of about 1:1:0.2 was added to 200 ml. of a solution containing 200 grams ammonia per liter and 1.5 molar ammonium chloride. The pH of the solution at this point was 10.85. The suspension was heated to boiling to dissolve the basic carbonate mixture and maintained at boiling temperature for about 2 minutes until the carbonate mixture was essentially completely dissolved. The ammonium chloride concentration of the solution was then increased to about 3.5 molar by addition of 21 grams of ammonium chloride to the reaction flask. The solution was then rapidly cooled to about 18° C. and maintained at that temperature for 60 minutes. The crystalline material was then filtered and dried in air at room temperature. Chemical analyses showed the $Ni(NH_3)_6Cl_2$ to contain 24% nickel, 1.14% copper and 0.34% cobalt, i.e. a Ni:Cu:Co weight ratio of 100:4.8:1.4.

The filtrate after removing the crystalline material contained 42.6 grams copper, 4.2 grams nickel and 6.0 grams cobalt per liter, i.e. a Cu:Ni:Co ratio of 100:9.9:14.1. The pH of the filtrate was 9.95. To 150 ml. of the filtrate was added anhydrous ammonia until a pH of 10.85 was reached. The solution was then allowed to stand for 30 minutes. During the 30 minutes an additional amount of crystalline $Ni(NH_3)_6Cl_2$ was formed. The crystalline material was filtered and analyzed showing a 22.6% nickel, 2.86% copper and 0.55% cobalt content. The resulting filtrate contained 34.7 grams copper, 1.77 grams nickel and 4.83 grams cobalt per liter, i.e. a copper:nickel:cobalt ratio of 100:5.1:13.9.

Example V

Example V shows that a double separation procedure allows buildup of the copper concentration in the ammoniacal solution to a concentration which is desirable for further processing of the solution to recover the copper and cobalt. Another aspect of this feature is that the buildup of the concentration of the copper and cobalt also results in an improved separation of the nickel from the copper.

To 150 ml. of the final filtrate obtained from the experiment of Example IV was added 24 grams of a basic carbonate mixture containing copper, nickel and cobalt in a weight ratio of 1:1:0.2. It will be recalled that the final filtrate from Example IV contained a copper, nickel, cobalt ratio of 100:5.1:13.9. The suspension was heated to boiling and maintained at this temperature for about 2 minutes. Ammonium chloride was then added to the reaction flask to bring the total ammonium chloride concentration to about 3.5 molar. The solution was then rapidly cooled to room temperature while adding anhydrous ammonia to maintain a pH value of about 10.8. After 30 minutes of crystallization the crystalline $Ni(NH_3)_6Cl_2$ was filtered from the solution. The crystalline material contained 23.0% nickel, 2.31% copper and 0.92% cobalt. The filtrate analyzed 66.2 grams copper, 1.01 grams nickel, and 8.05 grams cobalt per liter, i.e. a copper nickel ratio of 100:1.5.

Example VI

A portion of the $Ni(NH_3)_6Cl_2$ prepared in the experiment of Example V was added to 100 ml. of a solution containing 200 grams ammonia per liter and 1.5 molar ammonium chloride. The solution had a pH value of 10.85. The $Ni(NH_3)_6Cl_2$ used assayed 23.0% nickel, 2.31% copper and 0.92% cobalt, i.e. a nickel, copper, cobalt ratio of 100:10:4.7. The suspension was heated to boiling and maintained at boiling temperature for about 2 minutes to assure complete dissolution of the $$Ni(NH_3)_6Cl_2$$

The reaction flask and its contents were then rapidly cooled to room temperature thus crystallizing nickel ammine chloride. The recrystallization was allowed to continue for 30 minutes and the crystalline material separated by filtering. The crystalline material was heated at 150° C. for 30 minutes resulting in the decomposition of the $Ni(NH_3)_6Cl_2$ to $Ni(NH_3)_2Cl_2$. Chemical analyses showed the $Ni(NH_3)_2Cl_2$ to contain 36.1% nickel, 0.08% copper and 0.28% cobalt, i.e. a nickel, copper, cobalt ratio of 100:0.22:0.78.

This example illustrates that the crystallization procedure of this invention can be used to recover a nickel salt having less than one part copper and cobalt per 100 parts of nickel.

Example VII

Example VII illustrates the application of the invention for the separation of nickel from cobalt.

Eighteen grams of a carbonate mixture containing nickel and cobalt in a weight ratio of 1:0.2 was added to 250 ml. of a solution containing 200 grams ammonia per liter and 1.5 molar ammonium chloride. The suspension was heated to boiling and maintained at boiling temperature until the carbonates had completely dissolved. Ammonium chloride was then added to the solution to increase the ammonium chloride concentration to 3.5 molar. The solution, after dissolution of the ammonium chloride, was rapidly cooled to room temperature to crystallize the nickel as $Ni(NH_3)_6Cl_2$. The crystallization was allowed to continue for about 30 minutes. The crystalline material was filtered and washed with 50 ml. of ammonium hydroxide (200 grams ammonia per liter). After drying at room temperature the crystalline $Ni(NH_3)_6Cl_2$ weighed 23.1 grams and analyzed 23.4% nickel and 0.0153% cobalt, i.e. a nickel:cobalt weight ratio of 100:0.07.

What I claim is:

1. The method of separating nickel from a metal salt mixture, containing metals selected from the group consisting of nickel and copper; nickel and cobalt; nickel, copper and cobalt, comprising the steps of
   (A) dissolving the metal salt mixture in a solution of ammonium hydroxide and ammonium chloride while heating the solution to the solution boiling temperature,
   (B) rapidly cooling the solution while maintaining an ammonium chloride concentration in the solution between at least 1 and about 4 molar whereby nickel is selectively separated from the solution as crystalline hexammine nickel chloride, and
   (C) separating the crystalline hexammine nickel chloride from a nickel depleted solution.

2. The method of claim 1 wherein the metal salt mixture is a mixture of nickel carbonate, copper carbonate, cobalt carbonate and incidental impurities.

3. The method of claim 2 wherein the ammonia concentration is such that the pH value of the solution during the cooling step is maintained at about 10.0 or higher.

4. The process of claim 1 wherein the nickel depleted solution from Step (C) is used to dissolve additional metal salt mixture, containing metals selected from the group consisting of nickel and copper; nickel and cobalt; nickel, copper and cobalt, and repeating Steps (B) and (C).

5. The process of claim 1 wherein the crystalline hexammine nickel chloride obtained in Step (C) is redissolved in a solution of ammonium hydroxide and ammonium chloride at the solution boiling temperature and the solution rapidly cooled.

6. The method of separating nickel from cobalt comprising the steps of
   (A) dissolving a metal salt containing cobalt and nickel in a solution of ammonium hydroxide and ammonium chloride while heating the solution to the solution boiling temperature,
   (B) rapidly cooling the solution while maintaining an ammonium chloride concentration in the solution between at least 1 and about 4 molar whereby nickel is selectively separated from the solution as crystalline hexammine nickel chloride, and
   (C) separating the crystalline hexammine nickel chloride from a nickel depleted solution.

References Cited
UNITED STATES PATENTS

| | | | |
|---|---|---|---|
| 763,053 | 6/1904 | Frasch | 423—140 |
| 2,993,782 | 7/1961 | Hampton et al. | 75—119 X |
| 3,380,801 | 4/1968 | Williams et al. | 75—119 X |
| 3,642,440 | 2/1972 | Holmes et al. | 423—140 |

MILTON WEISSMAN, Primary Examiner

U.S. Cl. X.R.

423—42